H. S. WALKER.
COASTER BRAKE.
APPLICATION FILED MAR. 11, 1913.
1,089,997.
Patented Mar. 10, 1914.
2 SHEETS—SHEET 1.
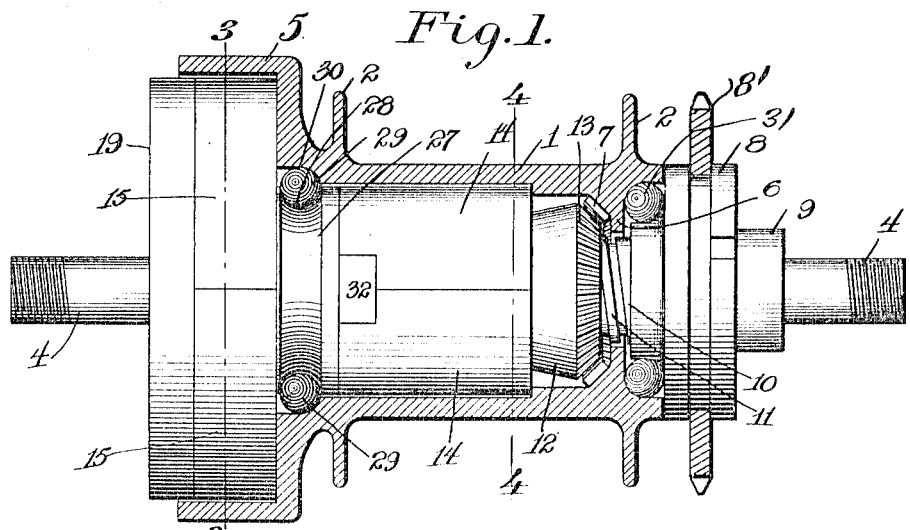
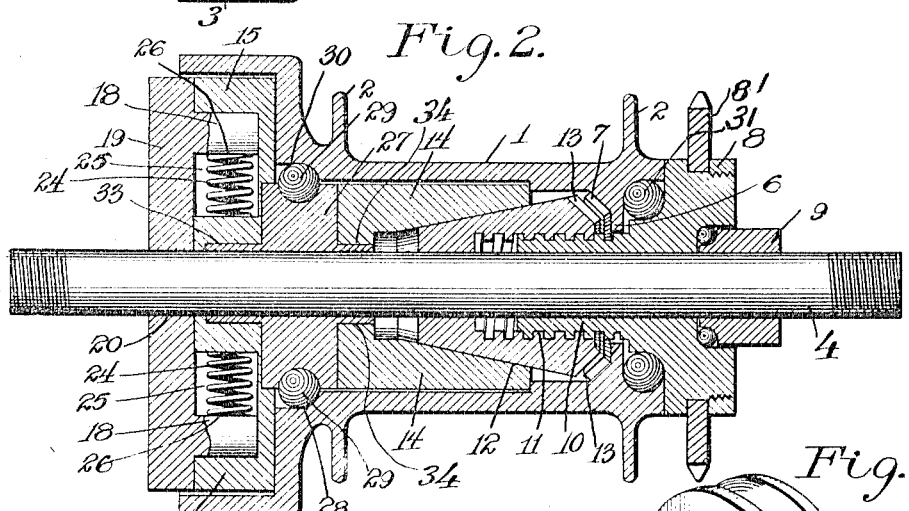
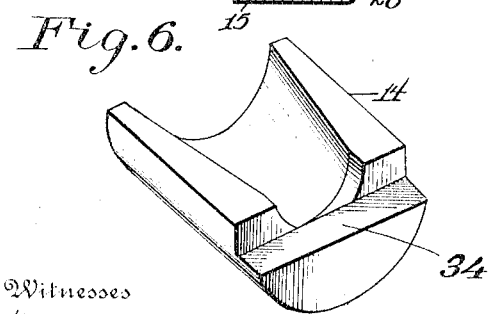
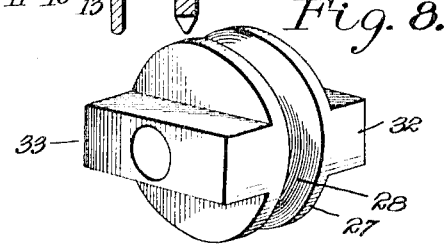
Inventor
Henry S. Walker.
Witnesses
W. H. Mulligan.
R. M. Smith.
By Victor J. Evans.
Attorney H. S. WALKER.
COASTER BRAKE.
APPLICATION FILED MAR. 11, 1913.
1,089,997.
Patented Mar. 10, 1914.
2 SHEETS—SHEET 2.
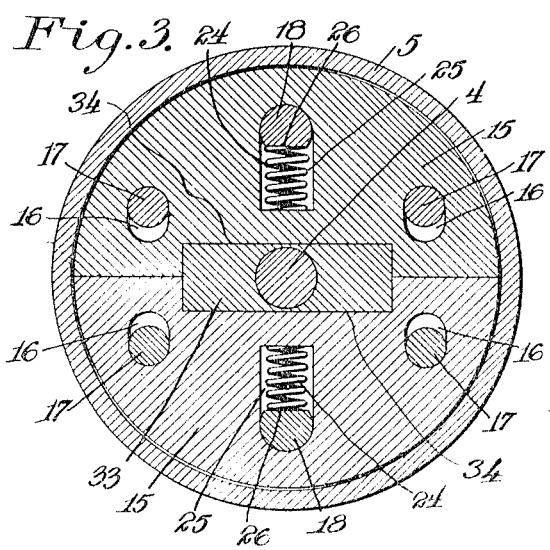
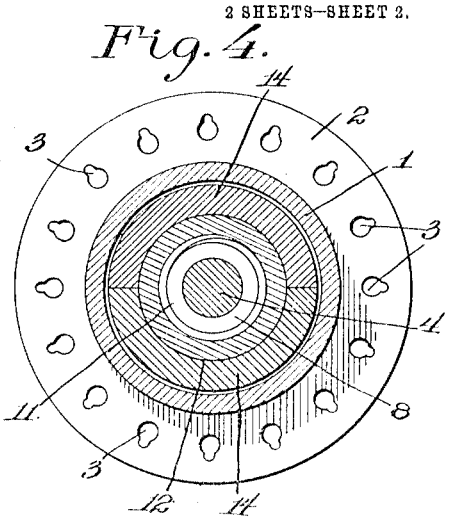
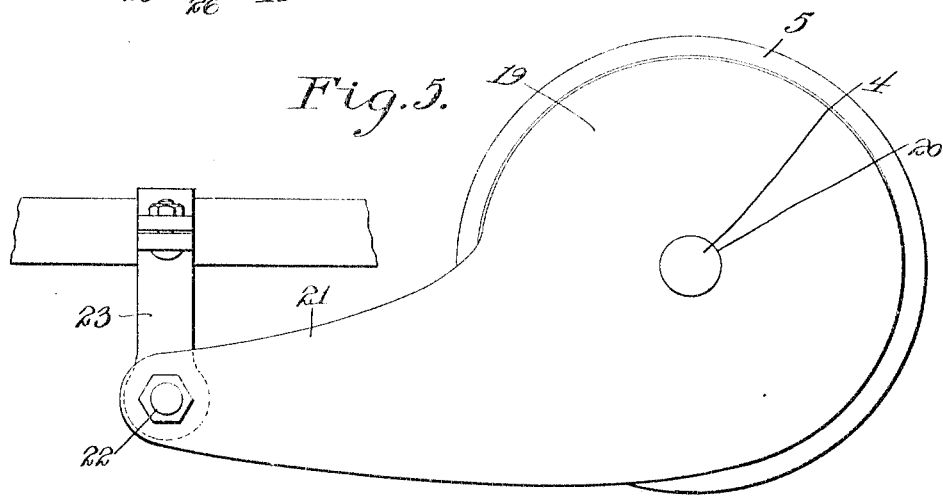
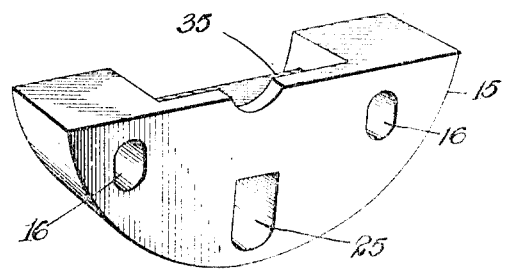
Inventor
Henry S. Walker
By Victor J. Evans
Attorney
Witnesses
Wm. F. Mulligan

UNITED STATES PATENT OFFICE.

HENRY S. WALKER, OF WALES, MASSACHUSETTS.

COASTER-BRAKE.

1,089,997.

Specification of Letters Patent.

Patented Mar. 10, 1914.

Application filed March 11, 1913. Serial No. 753,557.

*To all whom it may concern:*

Be it known that I, HENRY S. WALKER, a citizen of the United States, residing at Wales, in the county of Hampden and State of Massachusetts, have invented new and useful Improvements in Coaster-Brakes, of which the following is a specification.

This invention relates to coaster brakes, the object of the invention being to provide a brake of the class referred to, embodying an extremely simple construction and relative arrangement of parts, and also obtaining a double braking action, or in other words, the simultaneous operation of two sets of brake shoes, one of which coacts with the hub shell of the wheel, in connection with which the device is used, the other set operating against a drum which revolves with the hub and is arranged at one end thereof.

Another object of the invention is to provide, in combination with two sets of brake shoes and means for operating one set of brake shoes, a coupling member which is located in such relation to the two sets of shoes that the braking action of one set of shoes is transmitted, through the medium of the coupling member, to the other set of brake shoes, causing the latter to be thrown into action.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a longitudinal section taken through the hub of a wheel, showing the remaining parts of the coaster brake mechanism of this invention in elevation. Fig. 2 is a similar section taken through all of the parts, with the exception of the axle, which is shown in elevation. Fig. 3 is a cross section on the line 3—3 of Fig. 1. Fig. 4 is a cross section on the line 4—4 of Fig. 1. Fig. 5 is an end elevation of the same, looking toward the drum end of the hub. Fig. 6 is a detail perspective view of one of the hub engaging shoes. Fig. 7 is a similar view of one of the drum engaging shoes. Fig. 8 is a detail perspective view of the coupling member.

Referring to the drawings, 1 designates the body or shell of a wheel hub, such as ordinarily used in bicycles, motorcycles, and the like, said hub being provided at suitable distances apart with spoke engaging flanges 2, which are shown as provided with keyhole slots 3, in which the enlarged and laterally bent headed ends of the spokes are secured in a manner well understood by those familiar with the art to which this invention appertains.

4 designates the wheel axle which passes centrally and longitudinally through the hub 1, and is ordinarily secured in fixed relation to the machine frame.

In carrying out the present invention, I provide the hub 1 at one end thereof with a relatively large drum 5, within which are arranged the internal expanding brake shoes, hereinafter particularly referred to.

Adjacent to its opposite end, the hub is provided with an internal flange 6 which is toothed or serrated, as shown at 7, for a purpose which will hereinafter appear.

Mounted to turn on the axle 4 is a rotary driving and brake actuating member 8, which ordinarily carries the sprocket wheel 8', from which the usual sprocket chain extends to another sprocket wheel on the pedal shaft. The member 8 is mounted to turn freely on the axle 4 by means of ball bearings, 9 designating one of the ball cones at that end of the hub.

The driving member 8 which is adapted to be turned either in a forward or backward direction, or held stationary by means of the usual pedals, is provided with an inward extension 10 which is threaded, as shown at 11, to receive a tapered expander which is threaded on the extension 11 and provided with a tapered expanding face 12, and a toothed or serrated face 13, the last-named face being adapted to be moved into and out of engagement with the toothed face 7 of the stationary flange 6 within the hub.

Surrounding the expander 12 is a set of brake shoes 14, said brake shoes, together, forming a longitudinally divided cylinder, the sections of which are movable independently of each other into and out of engagement with the inner surface of the hub or shell 1. Interiorly, the shoes 14 are tapered to agree with the taper of the expander, so that when the latter is moved toward the center of the hub by the action of the threaded extension 11, said expander serves to force the brake shoes outwardly into braking engagement with the hub.

Internal expanding brake shoes 15 are arranged within the enlarged drum 5 at the end of the hub, and are designed to work in conjunction with and in addition to the brake shoes 14, hereinabove described. The shoes 15 are provided with slots 16, all of which are shown as extending in parallel planes and being designed to receive holding pins 17 and 18 projecting inwardly from and bearing a fixed relation to an anchoring member or plate 19. This plate 19 is provided with a central opening 20 to receive the axle 4, and in order to hold said anchoring member stationary, it is provided with an arm 21 having a hole 22 therein, by means of which it is adapted to be bolted or otherwise fastened to the machine frame with the aid of a clip 23, or the equivalent thereof, as shown in Fig. 6. The brake shoes 15 are divided from each other on a diametrical line, as illustrated, and the slots 16 admit of the sections moving toward and away from each other on the pins 17, which pins, however, hold the shoes from revolving, so that when they are thrown outwardly into contact with the inner surface of the drum 5, they produce a braking effect thereon.

The shoes 15 are normally pressed inwardly by means of coiled springs 24 arranged in recesses 25 in the brake shoe sections, said springs 24 bearing at their outer ends against the inner sides of the diametrically opposite pins 18, the inner faces of which are flattened, at 26, to form more effective seats for the springs. The two sets of brake shoes 14 and 15 are connected for simultaneous operation by means of a key member 27, said key member being peripherally grooved to form a ball race 28, in which is arranged a series of balls 29 which work in ball races 30 within the adjacent end of the hub 1, forming a ball bearing support for said hub at that end. Another series of balls 31 is arranged at the opposite end of the hub between the driving wheel 8 and the hub. The member 27 is provided at opposite sides with keys 32 and 33, the key 32 fitting into notches 34 in the meeting faces of the brake shoes 14, while the key 33 fits into other notches 35 in the meeting faces of the brake shoes 15.

The operation of the mechanism hereinabove described is as follows: In starting the motorcycle or other machine, the driving member 8 is rotated in a forward direction, which causes the expander 12 to move toward the right. This brings the teeth 13 thereof into driving engagement with the teeth 7 within the hub 1, thereby propelling the wheel in a forward direction. As soon as the engine takes up its operation and drives the hub 1 through the usual connections (not shown), the operator holds back on the pedals and thereby causes the expander to move out of driving engagement with the hub. To apply the brake, the operator back pedals, until the expander forces the brake shoes 14 into frictional engagement with the inside of the hub 1. In this operation, a slight turning movement is imparted to the member 27 by means of the key 32 thereon. The other key 33 carried by the member 27 then operates to force the brake shoes 15 in opposite directions and into braking engagement with the interior face of the drum 5. Thus the member 27 transfers motion from one set of brake shoes to the other, so that when the hub engaging brake shoes are thrown into action, the internal expanding drum engaging shoes are also thrown into action, through the medium of the interposed key member.

What is claimed is:

1. In a coaster brake, a wheel hub, an axle, a driving and brake actuating member journaled on the axle at one end of the hub, an inwardly projecting threaded extension on said member, expanding brake shoes acting against the inside of the hub, a tapered expander threaded on said extension and serving to wedge said shoes apart, a drum on the end of the hub, internal expanding brake shoes engaging said drum, means to support the drum engaging shoes against rotation, and a key interposed between and engaging the two sets of brake shoes whereby the hub engaging shoes effect an expanding movement of the drum engaging shoes through the medium of said key.

2. In a coaster brake, a wheel hub, an axle, a driving and brake actuating member journaled on the axle at one end of the hub, an inwardly projecting threaded extension on said brake actuating member, expanding brake shoes acting against the inside of the hub, a tapered expander threaded on said extension and serving to wedge said shoes apart, a drum on the end of the hub, internal expanding brake shoes engaging said drum, means to support the drum engaging shoes against rotation, a key interposed between and engaging the two sets of brake shoes whereby the hub engaging shoes effect an expanding movement of the drum engaging shoes through the medium of said key, and means serving to yieldingly sustain the drum brake shoes away from the drum.

3. In a coaster brake, a wheel hub, an axle, a driving and brake actuating member journaled on the axle at one end of the hub, an inwardly projecting threaded extension on said brake actuating member, expanding brake shoes acting against the inside of the hub, a tapered expander threaded on said extension and serving to wedge said shoes apart, a drum on the end of the hub, internal expanding brake shoes engaging said drum, means to support the drum engaging shoes against rotation and a key interposed between and engaging the two sets of brake shoes whereby the hub engaging shoes effect an expanding movement of the drum engaging shoes through the medium of said coupling member, said coupling member forming a ball race of a ball bearing on which said hub turns.

4. In a coaster brake, a wheel hub, an axle, a driving and brake actuating member journaled on the axle at one end of the hub, an inwardly projecting threaded extension on said brake actuating member, expanding brake shoes acting against the inside of the hub, a tapered expander threaded on said extension and serving to wedge said shoes apart, a drum on the end of the hub, internal expanding brake shoes engaging said drum, means to support the drum engaging shoes against rotation, a coupling member interposed between the two sets of brake shoes, and keys on said coupling member, the brake shoes at opposite sides of said coupling member being engaged by said keys in such manner that through the medium of the coupling member the braking action of one set of brake shoes causes the braking action of the other set.

5. In a coaster brake, a wheel hub, an axle, a driving and brake actuating member journaled on the axle at one end of the hub, an inwardly projecting threaded extension on said brake actuating member, expanding brake shoes acting against the inside of the hub, a tapered expander threaded on said extension and serving to wedge said shoes apart, a drum on the end of the hub, internal expanding brake shoes engaging said drum, an anchoring member by which the drum engaging shoes are supported and held, and a key interposed between and engaging the two sets of brake shoes whereby the hub engaging shoes effect an expanding movement of the drum engaging shoes through the medium of said key.

6. In a coaster brake, a wheel hub, an axle, a driving and brake actuating member journaled on the axle at one end of the hub, an inwardly projecting threaded extension on said brake actuating member, expanding brake shoes acting against the inside of the hub, a tapered expander threaded on said extension and serving to wedge said shoes apart, a drum on the end of the hub, internal expanding brake shoes engaging said drum and formed with slots, an anchoring member, pins on the latter lying in said slots, and a key interposed between and engaging the two sets of brake shoes whereby the hub engaging shoes effect an expanding movement of the drum engaging shoes through the medium of said key.

In testimony whereof I affix my signature in presence of two witnesses.

HENRY S. WALKER.

Witnesses:
OZRO P. ROYCE,
JAMES H. WALKER.